DIE FOR DIELECTRIC HEAT SEALING

Filed March 18, 1964 4 Sheets-Sheet 1

Inventor
Ernest J. Braun
By Dressler, Goldsmith, Clement, Gordon & Ladd
Attorneys Inventor
Ernest J. Braun
By Dressler, Goldsmith, Clement, Gordon & Ladd
Attorneys Inventor
Ernest J. Braun
By Dressler, Goldsmith, Clement, Gordon & Ladd
Attorneys

DIE FOR DIELECTRIC HEAT SEALING

Filed March 18, 1964 4 Sheets-Sheet 4

Inventor
Ernest J. Braun
By Dressler, Goldsmith, Clement, Gordon & Ladd
Attorneys United States Patent Office 3,355,345

Patented Nov. 28, 1967

3,355,345

DIE FOR DIELECTRIC HEAT SEALING

Ernest J. Braun, Chicago, Ill., assignor, by mesne assignments, to Union Carbide Corporation, New York, N.Y., a corporation of New York Filed Mar. 18, 1964, Ser. No. 352,748
9 Claims. (Cl. 156—380)

This invention relates to a dielectric heating system, and, more particularly, to a dielectric heating system for bonding fusible material.

The most common type of heating is conductive heating wherein heat is applied to the outside of a surface and the inherent conduction of the material transfers heat inwardly, resulting in uneven heat distribution between inner and outer portions of the material. In dielectric heating however, a nonconductive material having a high dielectric constant can be effectively and uniformly heated. In other words, a nonconductive material can produce a substantial amount of heat in response to its molecular activity caused by an alternating potential applied across the material.

The application of a high frequency electrical potential across the material causes unrest of the molecules thereof due to the rapid polarity shift. Applying atomic theory, it is apparent that the electrons are repelled by a negative conductor and attracted by a positive. When the polarity reverses, the nucleus of the atom which is oppositely charged receives an opposite force simultaneously with the electron change. An appreciable temperature rise is obtained due to the great number of polarity reversals per second. It should be noted that frequencies within the range of one to one hundred megacycles are commonly used in dielectric heating applications.

*Dielectric heat sealing*

Dielectric heating has been found useful in the heat sealing field wherein pressure is applied at the portion to be sealed and the material is heated to its fusing temperature at the area where the seal is desired. In many prior art applications not employing dielectric heating principles, pre-heated dies having the shape of the seam are applied to the surfaces of the materials to be sealed. Although this method is fairly effective when the members to be sealed are relatively thin, a serious problem occurs when a plurality of thin members or thicker members are to be sealed. If the material is a poor thermal conductor the temperature at the outer surfaces of the material will greatly exceed the temperature at the most critical area, namely, at the surface to be fused. Due to the inevitable temperature gradient with this prior art method, a faulty seam may occur. Furthermore, the amount of pressure and temperature to apply depends upon the thickness and the thermal conductivity of the material, and even when the same type of material is repeatedly used, the temperature must be adjusted in accordance with the thickness thereof, due to the temperature gradient between the outer surface and the area to be sealed.

In dielectric heating applications the dies which apply the pressure to the material to be sealed are used as the electrodes of the dielectric heating source. The high frequency potential applied by the dies causes rapid molecular movement which results in the generation of heat within the material itself. In contrast with conductive heating, it is apparent that with dielectric heating the outer surfaces of the materials to be bonded are at the coolest temperature and the greatest amount of heat occurs at the area at which fusion is to occur. The heat bonding effectiveness of this system is readily apparent.

In some of the prior art heat sealing applications, an undesirable outer seam or bead which is in the area that has been fused has occurred in the absence of considerable care. In many applications this bead has been found not only disturbing in appearance but also a hinderance in the operability of the resulting heat sealed article. Since this bead is actually the fused portion, the severing of the bead results in the loss of the seal and, hence, the joint is no longer bonded.

*Heat sealing of scouring pads*

In the co-pending application of Joseph J. Klein, Ser. No. 158,150, filed Dec. 11, 1961 and assigned to the assignee of the present invention, there is disclosed a novel scouring pad and a method of making the same. The scouring pad of the co-pending application is formed of a pair of fibrous batts which are heat sealed to enclose a washing composition, such as soap or detergent in solid form. The outer surface of the pad has grit adhered thereto to provide a continuous scouring surface extending over the entire outer surface of the pad.

In making the batt the individual fibers are preferably arranged in three-dimensional random arrangement and both surfaces of the fibrous layer are wetted lightly with a flexible adhesive that may thereafter be heat sealed. The amount of adhesive is sufficient to coat the outer fibers of the batt so that they adhere to each other and to the transversely extending fibers at their spaced points of contact only, and the spaces between the fibers are substantially free of adhesive. The amount of adhesive sprayed on either surface of the fibrous layer is sufficient to bond the fibers together so as to form a self-sustaining batt when it is cut into a size suitable for a cleaning or scouring pad. The bonding of the fibers prevents them from pulling out of the pad during cleaning or scouring operations and thereby insures dimensional stability of the pad for a much longer period of time than is possible with unbonded fibers. The adhesive permits the marginal edge portions of two superimposed fibrous batts to be heat sealed to enclose washing composition in solid form to form a cleaning or scouring pad.

The adhesive may comprise any suitable adhesive material, resinous or otherwise, which will fuse under heat and coalasce to bind the fibrous batts into a unitary pad. Examples of thermoplastic adhesives which may be used are polyvinyl alcohol, polyvinyl chloride, or polyvinyl acetate or the copolymers thereof, and natural resinous adhesive materials such as rosin, and the like. It is also possible to use a rubbery adhesive binder composition comprising butadiene-acrylonitrile copolymer latex having about 60 parts butadiene to 40 parts acrylonitrile, sold commercially by B. F. Goodrich Company under the trade mark, "Hycar Latex 1561" and cured to a stable resilient rubbery condition.

In its optimum embodiment, the scouring pad of the co-pending Klein application is circumferentially sealed in such a manner that there is a minimal bead of fused thermoplastic along the sealing periphery. Avoidance of a substantial bead is highly desirable since the abrasive and resilient qualities of the pad are thereby extended to the very edges thereof and are thus made available to clean the inner corners of soiled utensils. In addition, avoidance of a peripheral sealing bead enhances the appearance of the scouring pad.

In accordance with one embodiment of this invention, apparatus and method are provided to seal the edges of the aforementioned Klein scouring pad reliably and rapidly with a minimal peripheral bead of fused material.

Although the present invention is not limited to use in the manufacture of the scouring pads of the co-pending application, it will be generally described with reference thereto. It is to be understood however, that the invention can be used with all heat fusible materials, although it is particularly useful in the sealing of fluffy materials wherein outer beads of fused material have caused the most difficulty.

*The present invention*

The dielectric heating system of the present invention provides a reliable solution to the problem of having an unsightly bead extending along the sealed portion of the heat bonded material.

In one embodiment of the present invention the heat fusible material is inserted between a first and second electrode of a dielectric heating source. The first electrode is a die which includes a first blade mounted upon an electrically conductive platen substantially perpendicular thereto for communication with a first portion of the heat fusible material to form the outer dimensions thereof. A second blade is mounted on the platen substantially perpendicular thereto and is adapted for communication with a second portion of the heat fusible material exterior said first portion. Both blades are circumferentially disposed in the form of the desired seam.

The electrodes are pressed against the surfaces to be sealed and a high frequency alternating potential is applied across the electrodes to generate heat within the material. The combination of the heat generated within the material by the high frequency electrical energy and the pressure exerted by the die causes the material to be heat bonded. The electrodes are then released from the material surfaces so that the heat bonded material can be removed and the residue severed.

In one form of the invention the edge of the first blade extends a greater vertical distance from the electrically conductive platen, upon which the blades are mounted, than the edge of the second blade. Additionally, at least one of the blade edges is tapered with the tapered side facing the work product side of the material. The tapered blade edge provides a force acting to push the material toward the work product, resulting in a highly effective seal.

To achieve distortion free scouring pads, substantially electrically nonconductive support means are provided adjacent the first blade and are located within the circumference to allow freedom of expansion of the fluffy batt. In a preferred embodiment of the invention the second electrode has means to allow the batt to expand during the sealing operation in the direction of the second electrode so that the resulting pad is symmetrical in thickness with respect to the central plane.

Certain materials have been found to stick to the electrode after the heat sealing operation. Furthermore, in materials where the dielectric strength of the material is not constant throughout its area the possibility of the material breaking down exists due to the voltage applied thereto, and a serious arcing might occur. Although this might dictate the lowering of the potential applied thereacross it should be noted that the heating effect is a function of the square of the voltage. Therefore, it is desirable to use the maximum amount of voltage possible, keeping safety precautions in view, however.

In one embodiment of the invention, a rubberized buffer is inserted between the second electrode and the material to be bonded. Although there are many different materials of which the buffer may consist it is important that it be a material which is not able to fuse with the work or with the electrode. Hence, after the heat sealing has taken place the dies are removed and the heat bonded material does not stick to either the buffer or the electrode. Additionally, the tendency to arc is reduced due to the constant dielectric strength of the buffer. In making the scouring pads of the co-pending application S.N. 158,150, a buffer consisting of silicone rubber coated woven fiberglass has been found very effective.

A more detailed explanation of the invention is provided in the following description and claims and illustrated in the accompanying drawings which disclose by way of examples the principles of the invention and the best mode contemplated of applying those principles.

*Description of the invention*

Figures 1, 2, 5:
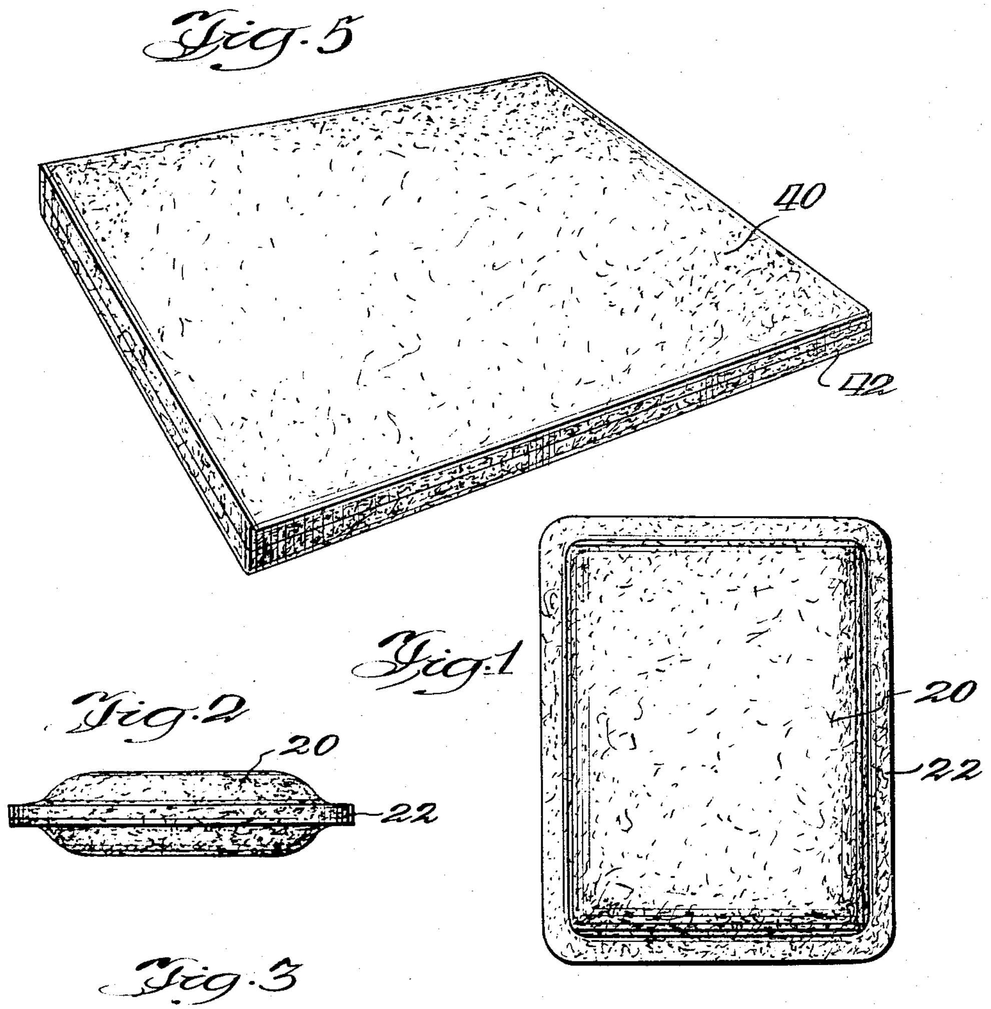
FIGURE 1 is a plan view of a scouring pad heat bonded by a method which produces a substantial peripheral bead.
FIGURE 2 is a side elevation thereof.
FIGURE 5 is a perspective view of a pair of fibrous batts from which the scouring pads are manufactured.

Referring to the drawings, in FIGURES 1 and 2 a scouring pad 20 is shown which has been sealed by a heat sealing method which produces a substantial peripheral bead 22. The outer edge or bead 22 of the scouring pad is ineffective for proper scouring since it has no resilience and since the fibers and adhesive therein are so fused that the washing composition in the interior is inaccessible. In addition, the bead is displeasing to the eye.

Figure 3:
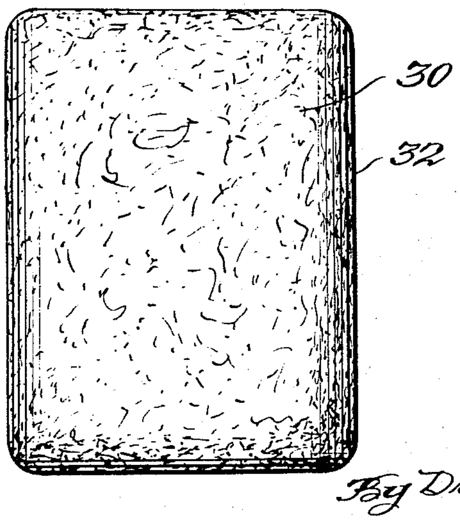
FIGURE 3 is a plan view of a scouring pad which has been heat bonded using the principles of the present invention.
Figure 4:
FIGURE 4 is a side elevation thereof.

In FIGURES 3 and 4 a scouring pad 30 having an evenly tapered edge 32 around its periphery is illustrated. Such an edge can be achieved by the apparatus and method of the present invention. The scouring pad is preferably of the type disclosed in the co-pending Klein application and comprises superposed lofty and resilient batts, heat sealed together at the outer edge portion 32. The superposed batts enclose a solid washing composition which is dimensioned to be too large to pass through the batts and is positioned inwardly of the marginal edges of the batts. The facing surfaces of the fibrous batts are lightly wetted with heat sealable adhesive for sealing the outer marginal edge portion 32 of the batt. To obtain scouring action, the surface is sprayed with an adhesive in which grit is embedded.

Two substantially rectangular superposed batts 40 and 42 are illustrated in FIGURE 5. In one embodiment of the invention six scouring pads are formed from the rectangular batts 40 and 42.

Figure 6:
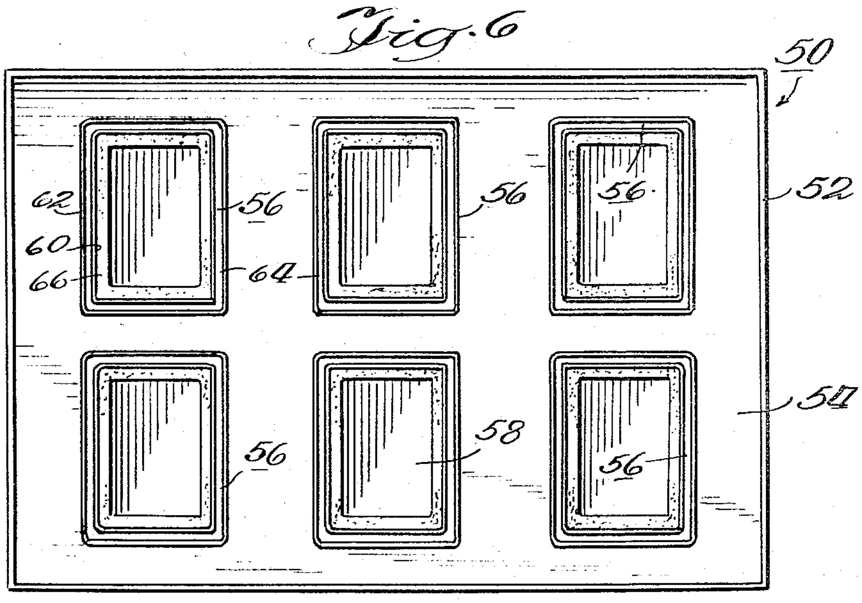
FIGURE 6 is a plan view of the die of the present invention which is used as the first electrode of the dielectric heating source.

In FIGURE 6 the platen 50, which is one of the elements used to shape and heat seal the resulting pad, is illustrated having an outer edge 52 which is preferably a metal such as brass affixed to a platen base 54, and six die members 56 mounted thereon.

Figures 7, 8, 9:
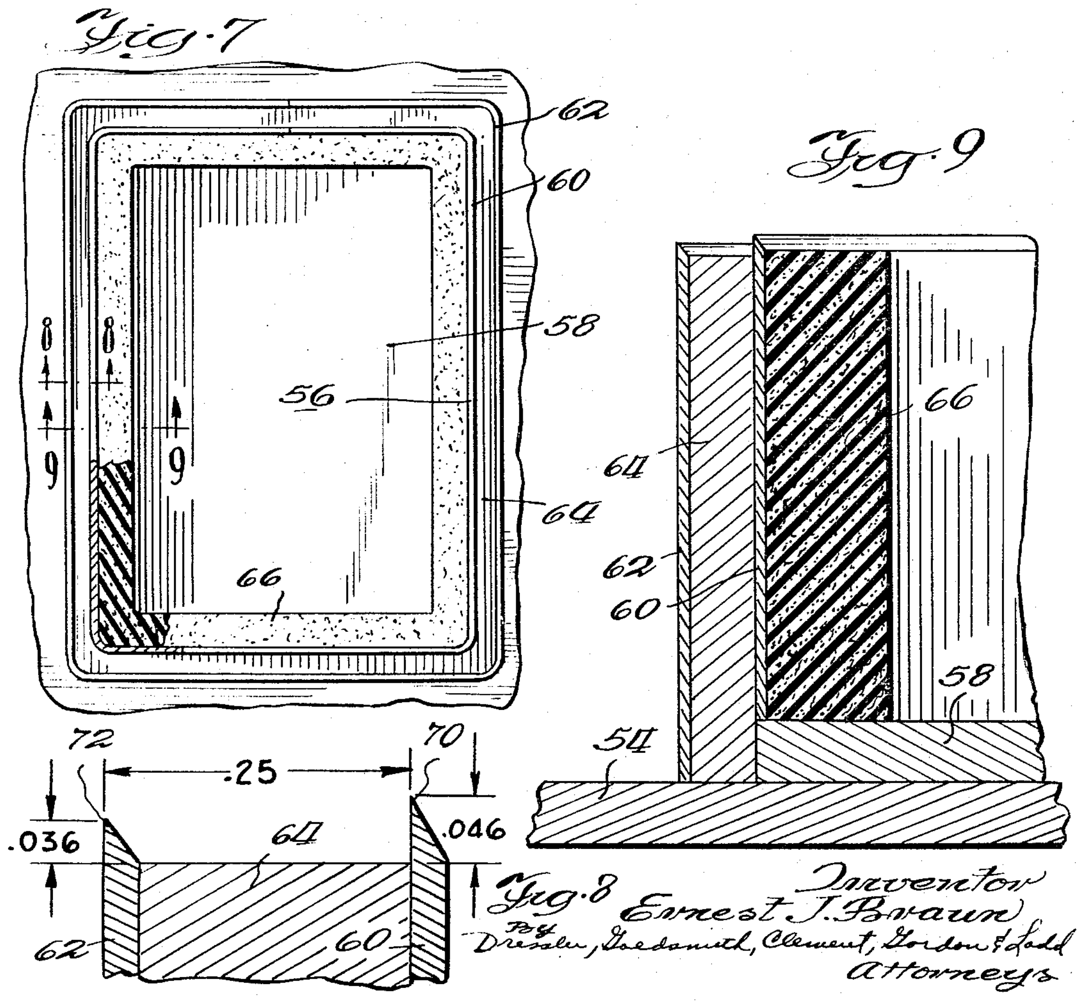
FIGURE 7 is an enlarged plan view of the die blades of FIGURE 6.
FIGURE 8 is a fragmentary enlarged sectional elevation of the die blade edges taken along line 8—8 of FIGURE 7.
FIGURE 9 is a fragmentary enlarged sectional elevation of the die blades and their associated structure, taken along line 9—9 of FIGURE 7.

As most clearly shown in FIGURES 7 through 9, die members 56 include a conductive plate 58 affixed to platen base 54. A first blade 60 is nested above conductive plate 58 and is circumferentially disposed in the form of the desired outer edge of the scouring pad. A second blade 62 is provided concentric to the first blade 60 and is affixed directly to platen base 54. A brass member 64 intermediate the two blades is affixed to platen base 54 and is adjacent the outer periphery of the first blade 60 and the outer periphery of the conductive plate 58. Although member 64 as described above is a brass member which is inherently conductive, non-conductive materials such as Bakelite or epoxy resins have also been found to be suitable.

A support member 66 is provided adjacent to and concentric with first blade 60. The support member 66 is nested upon conductive plate 68 and has been found effective in obviating permanent distortion of the scouring pad which would otherwise occur as a result of the expansion of the material during heat sealing. The support member 66 must consist of a material which is not heat bondable with the material to be sealed, and resilient materials such as neoprene sponge and silicone sponge have been found suitable. Ordinary rubber is not satisfactory because of the effects above the vulcanization temperature.

In the absence of the support member 66 there is a tendency for the fluffy batt fibers to pull apart while warm, thereby resulting in a weak seal due to the expansion of the fibers into the area within the blade 60 circumference. The use of a support member thus improves the web strength of the resulting scouring pad.

As shown most clearly in FIGURE 8, in the preferred embodiment, edge 70 of the first blade 60 extends a greater vertical distance from platen base 54 than does edge 72 of the second blade 62. In one embodiment of the invention edges 70 and 72 are tapered with the tapered side facing the work product side of the material so that the material is forced toward the work product by the blade edges.

Figures 10, 11:
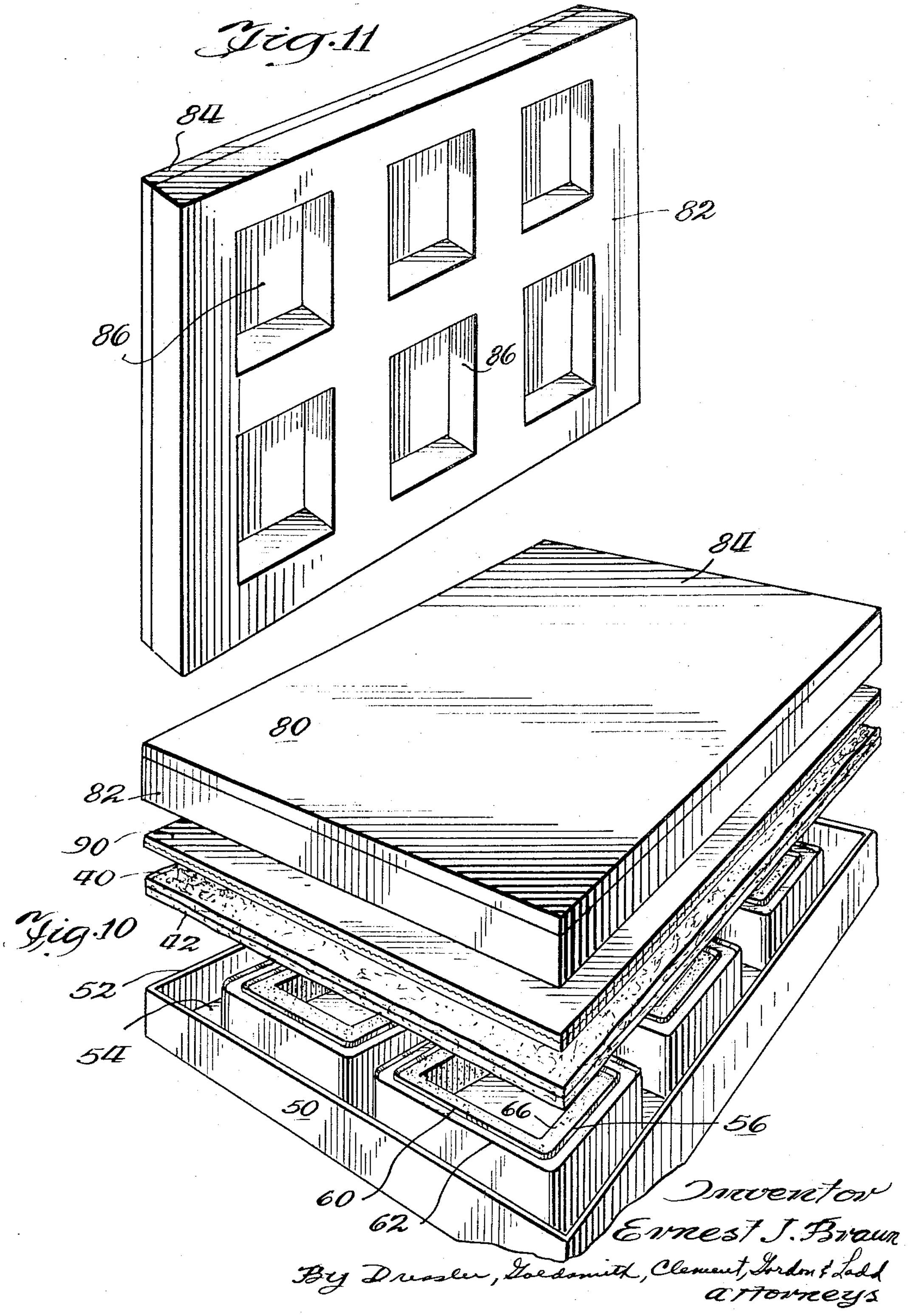
FIGURE 10 is a perspective view of the electrodes of the present invention with the work material and a buffer inserted therebetween.
FIGURE 11 is a perspective view of the second electrode of one embodiment of the invention showing the face which is disposed adjacent the work.
Figures 12, 13, 14, 15:
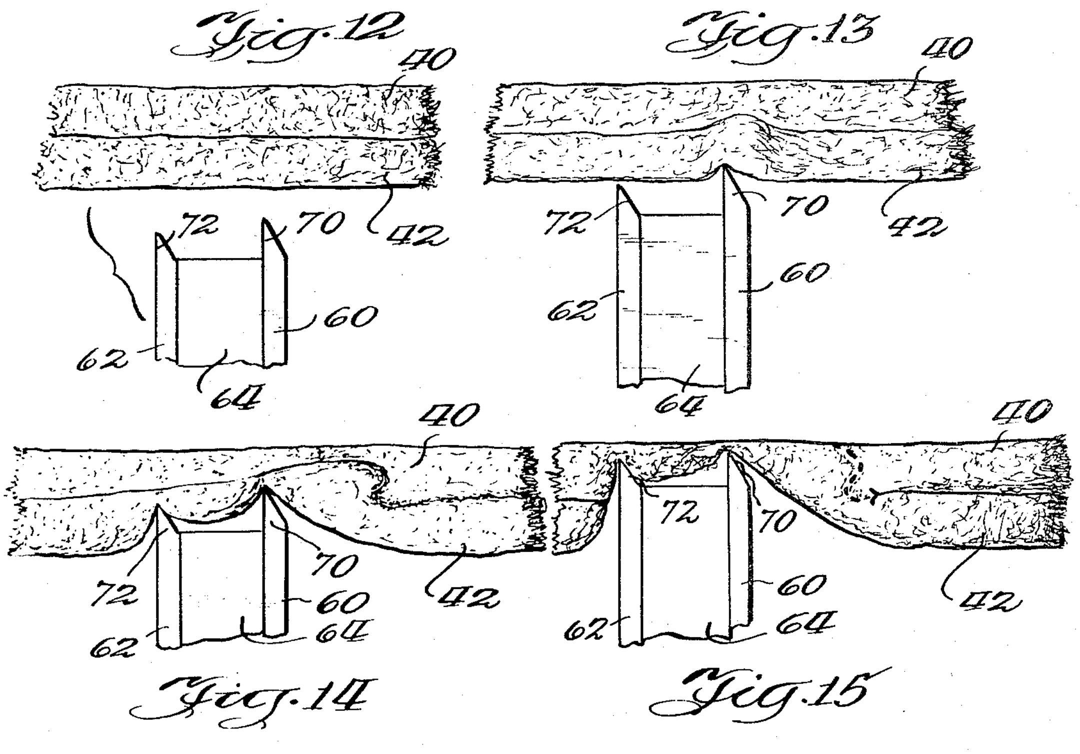
FIGURE 12 is a sectional operational view of the material in relation to the die blades prior to contact.
FIGURE 13 is a sectional operational view subsequent in time to the FIGURE 12 view showing contact of the first die blade with the work material.
FIGURE 14 is a sectional operational view subsequent in time to the FIGURE 13 view showing the material during pressure by both die blades.
FIGURE 15 is a sectional operational view thereof subsequent in time to the FIGURE 14 view showing the material when the first die blade has reached its furthest point.

FIGURE 10 illustrates the apparatus of the invention immediately prior to the formation of the scouring pads. The platen 50 which is used as one of the electrodes of the dielectric heating source is shown with die members 56 facing upwardly. Of course, platen 50 could be the upper electrode of the dielectric heating source and would hence be inverted. Six soap bars or solid detergent pieces are placed between the batts 40 and 42 in position so that they will be enclosed within the resulting scouring pads. The batts are inserted between the first platen 50 and the second conductive platen 80 which is used as the opposite electrode of the dielectric heating source.

In a preferred embodiment of the invention as illustrated in FIGURE 11, the platen 80 comprises a conductive grid 82 which is affixed to the platen base 84. The conductive grid has six apertures 86 corresponding to the six die members 56. The apertures 86 are smaller in circumferential dimension than the first blades 60, and are used to substantially eliminate distortion of the resulting scouring pads in the direction opposite to the die members 56.

The provision of support members in the apertures 86 such as the support members 66 used in conjunction with the die members 56 may be necessary under certain conditions in order to obtain a distortion-free product.

In a preferred form of the invention, a buffer 90 is inserted between the batt material 40 and the second conductive platen 80. In the absence of a buffer some of the batt material has a tendency to stick to the inside surface of the conductive platen 80. The buffer 90 eliminates this sticking when the buffer is formed of a material which is not heat fusible with the batt material. A buffer consisting of silicone rubber coated woven fiberglass is particularly satisfactory for sealing the pads of the co-pending Klein application. Buffers comprising Teflon® and porcelain have also been found suitable.

The buffer 90 may be affixed to the second conductive platen 80. Of course, if a conductive grid such as illustrated in FIGURE 11 is employed, it will be necessary to provide openings in the buffer at the areas overlying the apertures 86. It is preferable to retain an excess of buffer material by first cutting openings which have smaller areas than the apertures 86 and then cutting four corner slits so that the overlapping flaps which are formed can fall into the respective apertures. A further prevention of distortion is achieved by this expedient.

It was noted that where portions of the batt are less dense than other portions, a tendency to "cut through" becomes more pronounced and the possibility of arcing at the sparse portions exists. The buffer 90 helps alleviate this problem due to its relatively constant density.

*Operation*

In the operation of the system, the electrodes 50 and 80 are pressed against the surfaces of batts 42 and 40 respectively. If a buffer is employed, electrodes 50 and 80 close about the surfaces of the batt 42 and the buffer 90. A high frequency generator is used to apply an alternating potential across the batts by energizing the electrodes 50 and 80. In a typical example in which six scouring pads corresponding to those disclosed in the co-pending Klein application were produced, a frequency of 27 megacycles was used and approximately five kilowatts was dissipated for about two seconds.

The hypothetical operation of the die blades 60 and 62 is shown in FIGURES 12 through 15. It is seen that as the blades progress the heat fusible material is pushed to the right by the tapered blade edge. Furthermore, it is apparent that a bead is formed on the inside rather than the outer side of the work product which is on the right side of the die blade.

In a specific example, the blades could be separated by about 0.250 inch and the edge 70 of the first blade 60 could be vertically spaced about 0.010 inch further from the platen base 54 than the edge 72 of the second blade 62. The second blade edge 72 could extend about 0.036 inch from member 64. These dimensions have been found suitable in the manufacture of the scouring pads of the co-pending Klein application.

The batts 40 and 42 which have been heat sealed are subsequently removed from the dielectric heater after the electrodes are released from their surfaces. Subsequently the resulting scouring pads are mechanically severed from the residue of the batt material.

Figures 16, 17:
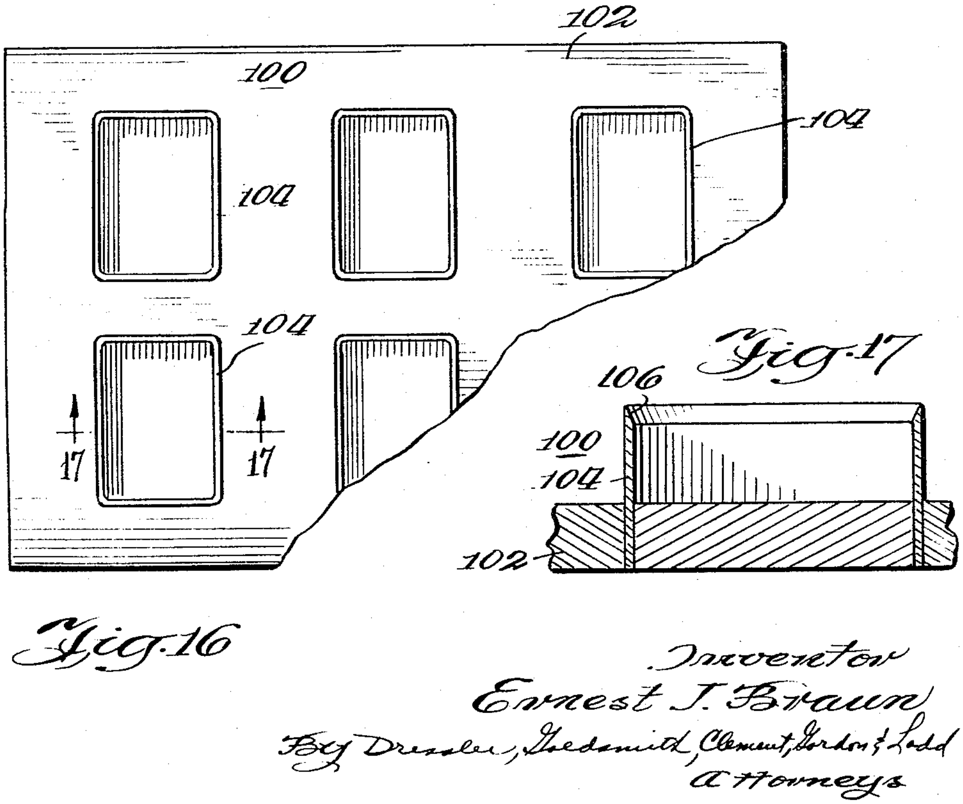
FIGURE 16 is a fragmentary plan view of the cutting plate used to sever the bonded scouring pad from the residue material.
FIGURE 17 is a sectional elevation of the cutter blade taken along the line 17—17 of FIGURE 16.

A cutting plate 100, illustrated in FIGURES 16 and 17, is employed to sever the scouring pads from the residue. Affixed to the cutter base 102 are circumferentially disposed cutting blades 104 which are positioned to correspond with the die members 56. The cutting blades 104 have the same circumferential dimensions as the first blade 60. Furthermore, one embodiment of the invention includes a taper of the edge 106 of blade 104 toward the work product such as the taper of edge 70 of the first die blade 60.

Although the invention has been specifically described with reference to the manufacture of scouring pads such as the pads of co-pending Klein application it is to be understood that many different articles requiring heat bonding could be sealed with the apparatus and method of the present invention.

In addition to an unnoticeable outer seam that is reliably obtained, the invention has also provided a means for producing a distortion free product which is particularly necessary when the material to be heat sealed is of a fluffy consistency. Furthermore, a means to substantially eliminate sticking and arcing has been provided by the present invention, therefore resulting in a more efficient operation.

The invention as applied to preferred embodiments has been shown and described. It will be understood that various omissions and substitutions and changes in the detail and form of the device illustrated and its operation may be made by those skilled in the art without departing from the spirit of the invention.

What is claimed is:

1. A die for use as an electrode of a dielectric heating source having a pair of electrodes between which the work is to be interposed, said die being adapted to form and seal heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being mounted on an electrically conductive platen with the edges of said blades being disposed substantially perpendicularly to said platen, the edge of said first blade extending a greater vertical distance from said platen than the edge of said second blade whereby the combination of the heat generated within the heat fusible material by the high frequency electrical energy and the pressure exerted by said die causes a heat bonded, substantially unnoticeable seam after the residue of heat fusible material is removed.

2. A die for use as an electrode of a dielectric heating source having a pair of electrodes between which the work is to be interposed, said die being adapted to form and seal heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being mounted on an electrically conductive platen with the edges of said blades being disposed substantially perpendicularly to said platen, at least one of said edges being tapered with the tapered side facing the work product side of the material, the edge of said first blade extending a greater vertical distance from said platen than the edge of said second blade whereby the combination of the heat generated within the heat fusible material by the high frequency electrical energy and the pressure exerted by said die causes a heat bonded, substantially unnoticeable seam after the residue of heat fusible material is removed.

3. A die for use as an electrode of a dielectric heating source having a pair of electrodes between which the work is to be interposed, said die being adapted to form and seal heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being mounted on an electrically conductive platen with the edges of said blades being disposed substantially perpendicularly to said platen, said edges being tapered with the tapered side facing the work product side of the material, the edge of said first blade extending a greater vertical distance from said platen than the edge of said second blade whereby the combination of the heat generated within the heat fusible material by the high frequency electrical energy and the pressure exerted by said die causes a heat bonded, substantially unnoticeable seam after the residue of heat fusible material is removed.

4. A die for use as an electrode of a dielectric heating source having a pair of electrodes between which the work is to be interposed, said die being adapted to form and seal heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being separated by a block of electrically conductive material and mounted on an electrically conductive platen with the edges of said blades being disposed substantially perpendicularly to said platen the edge of said first blade extending a greater vertical distance from said platen then the edge of said second blade whereby the combination of the heat generated within the heat fusible material by the high frequency electrical energy and the pressure exerted by said die causes a heat bonded, substantially unnoticeable seam after the residue of heat fusible material is removed.

5. A die for use as an electrode of a dielectric heating source having a pair of electrodes between which the work is to be interposed, said die being adapted to form and seal fluffy, generally heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being circumferentially disposed in the form of the desired seam, and mounted on an electrically conductive platen with the edges of said blades being disposed substantially perpendicularly to said platen, the edge of said first blade extending a greater vertical distance from said platen than the edge of said second blade whereby the combination of the heat generated within the heat fusible material by the high frequency electrical energy and the pressure exerted by said die causes a heat bonded, substantially unnoticeable seam after the residue of the heat fusible material is removed; substantially electrically nonconductive support means adjacent said first blades and located within said circumference to allow freedom of expansion of the fluffy heat fusible work product.

6. A die for use as an electrode of a dielectric heating source having a pair of electrodes between which the work is to be interposed, said die being adapted to form and seal fluffy, generally heat fusible material and including: a first blade for communication with a first portion of the work to form the outer dimension thereof; a second blade disposed in substantially parallel relationship with said first blade, said second blade being adapted for communication with a second portion of the work exterior said first portion, said blades being circumferentially disposed in the form of the desired seam, and mounted on an electrically conductive platen with the edges of said blades being disposed substantially perpendicularly to said platen, said edges being tapered with the tapered side facing the work product side of the material, the edge of said first blade extending a greater vertical distance from said platen than the edge of said second blade whereby the combination of the heat generated within the heat fusible material by the high frequency electrical energy and the pressure exerted by said die causes a heat bonded, substantially unnoticeable seam after the residue of heat fusible material is removed; substantially electrically nonconductive support means adjacent said first blades and located within said circumference to allow freedom of expansion of the fluffy heat fusible work product.

7. Apparatus for bonding two batts containing heat fusible material to form a scouring pad comprising: a dielectric heating source having a first and second electrode between which the batts are to be interposed; said first electrode including a first blade mounted thereon substantially perpendicular thereto for communication with a first portion of the batts to form the outer dimension thereof; a second blade mounted thereon substantially perpendicular thereto and adapted for communication with a second portion of the batts exterior said first portion, said blades being circumferentially disposed in the form of the desired seam and the edge of said first blade extending a greater vertical distance from said platen than the edge of said second blade whereby the combination of the heat generated within the batts by the high frequency electrical energy and the pressure exerted by said electrodes causes a heat bonded, substantially unnoticeable seam after the batt residue is removed; said second electrode having means to allow the batt to expand in the direction of said second electrode whereby the resulting pad is symmetrical in thickness with respect to the central plane.

8. Apparatus for bonding two batts containing heat fusible material to form a scouring pad comprising: a dielectric heating source having a first and second electrode between which the batts are to be interposed; said first electrode including a first blade mounted thereon substantially perpendicular thereto for communication with a first portion of the batts to form the outer dimension thereof; a second blade mounted thereon substantially perpendicular thereto and adapted for communication with a second portion of the batts exterior said first portion, said blades being circumferentially disposed in the form of the desired seam and the edge of said first blade extending a greater vertical distance from said platen than the edge of said second blade whereby the combination of the heat generated within the batts by the high frequency electrical energy and the pressure exerted by said electrodes causes a heat bonded, substantially unnoticeable seam after the batt residue is removed; said second electrode having means to allow the batt to expand in the direction of said second electrode whereby the resulting pad is symmetrical in thickness with respect to the central plane; and buffer means interposed between said batts and said second electrode to prevent the batt material from adhering to said second electrode and to restrain arc formation.

9. Apparatus for bonding two batts containing heat fusible material to form a scouring pad comprising: a dielectric heating source having a first and second electrode between which the batts are to be interposed; said first electrode including a first blade mounted thereon substantially perpendicular thereto for communication with a first portion of the batts to form the outer dimension thereof; a second blade mounted thereon substantially perpendicular thereto and adapted for communication with a second portion of the batts exterior said first portion, said blades being circumferentially disposed in the form of the desired seam and the edge of said first blade extending a greater vertical distance from said platen than the edge of said second blade whereby the combination of the heat generated within the batts by the high frequency electrical energy and the pressure exerted by said electrodes causes a heat bonded, substantially unnoticeable seam after the batt residue is removed; substantially nonconductive support means adjacent said first blade and located within said circumference to allow freedom of expansion of the batt; said second electrode having means to allow the batt to expand in the direction of said second electrode whereby the resulting pad is symmetrical in thickness with respect to the central plane.

References Cited

UNITED STATES PATENTS

| | | | |
|---|---|---|---|
| 2,631,646 | 3/1953 | Gannon et al. | 156—380 |
| 3,010,157 | 11/1961 | Cizek | 156—273 |
| 3,020,186 | 2/1962 | Lawrence | 156—251 |
| 3,026,233 | 3/1962 | Scholl et al. | 156—251 |
| 3,126,307 | 3/1964 | Drittenbass | 156—380 |
| 3,244,573 | 4/1966 | Raffaelli | 156—380 |

EARL M. BERGERT, *Primary Examiner.*

DOUGLAS J. DRUMMOND, *Examiner.*